United States Patent [19]

Fletcher et al.

[11] 4,040,041

[45] Aug. 2, 1977

[54] TWIN-CAPACITIVE SHAFT ANGLE ENCODER WITH ANALOG OUTPUT SIGNAL

[76] Inventors: James C. Fletcher, Administrator of the National Aeronautics and Space Administration, with respect to an invention of; Ronald J. Hruby, Campbell; Robert L. Wilson, Santa Clara, both of Calif.

[21] Appl. No.: 625,781

[22] Filed: Oct. 24, 1975

[51] Int. Cl.² .............................................. G08C 19/00
[52] U.S. Cl. .................................. 340/200; 323/93; 324/60 CD; 340/347 SH
[58] Field of Search ................. 340/200, 271, 347 SH, 340/179; 323/93; 324/60 CD, 118; 318/662; 317/253, 252, 256

[56] References Cited

U.S. PATENT DOCUMENTS

| | | | |
|---|---|---|---|
| 2,548,790 | 4/1951 | Higinbotham et al. | 340/200 |
| 2,977,536 | 3/1961 | Hindel | 324/60 CD |
| 3,059,228 | 10/1962 | Beck et al. | 340/347 SH |
| 3,683,402 | 8/1972 | Parnell | 340/200 |
| 3,702,467 | 11/1972 | Melnyk | 340/200 |
| 3,714,567 | 1/1973 | Kusters et al. | 324/118 |
| 3,729,728 | 4/1973 | Hardway | 340/200 |
| 3,820,095 | 6/1974 | Wojtasinki et al. | 340/200 |

*Primary Examiner*—John W. Caldwell
*Assistant Examiner*—James J. Groody
*Attorney, Agent, or Firm*—Darrell G. Brekke; John R. Manning

[57] ABSTRACT

A precision capacitive shaft encoder providing a d-c signal corresponding to the angular position of a shaft. Two variable capacitances are coupled in tandem by a rotatable shaft. Each capacitor has a capacitance that varies linearly with a change in the angular position of the shaft, and the sum of the two capacitances is always constant for any angular position of the shaft. Each capacitance is alternately coupled to a reference d-c voltage and a discharge circuit. The capacitances are electrically coupled in series and the charge periodically acquired at the junction of the capacitances is a function of the position of the shaft. An error-compensating voltage is imposed on the junction when the capacitances are coupled to the reference voltages, and the junction is coupled to sample-and-hold apparatus provided with a error-correcting circuit.

9 Claims, 8 Drawing Figures

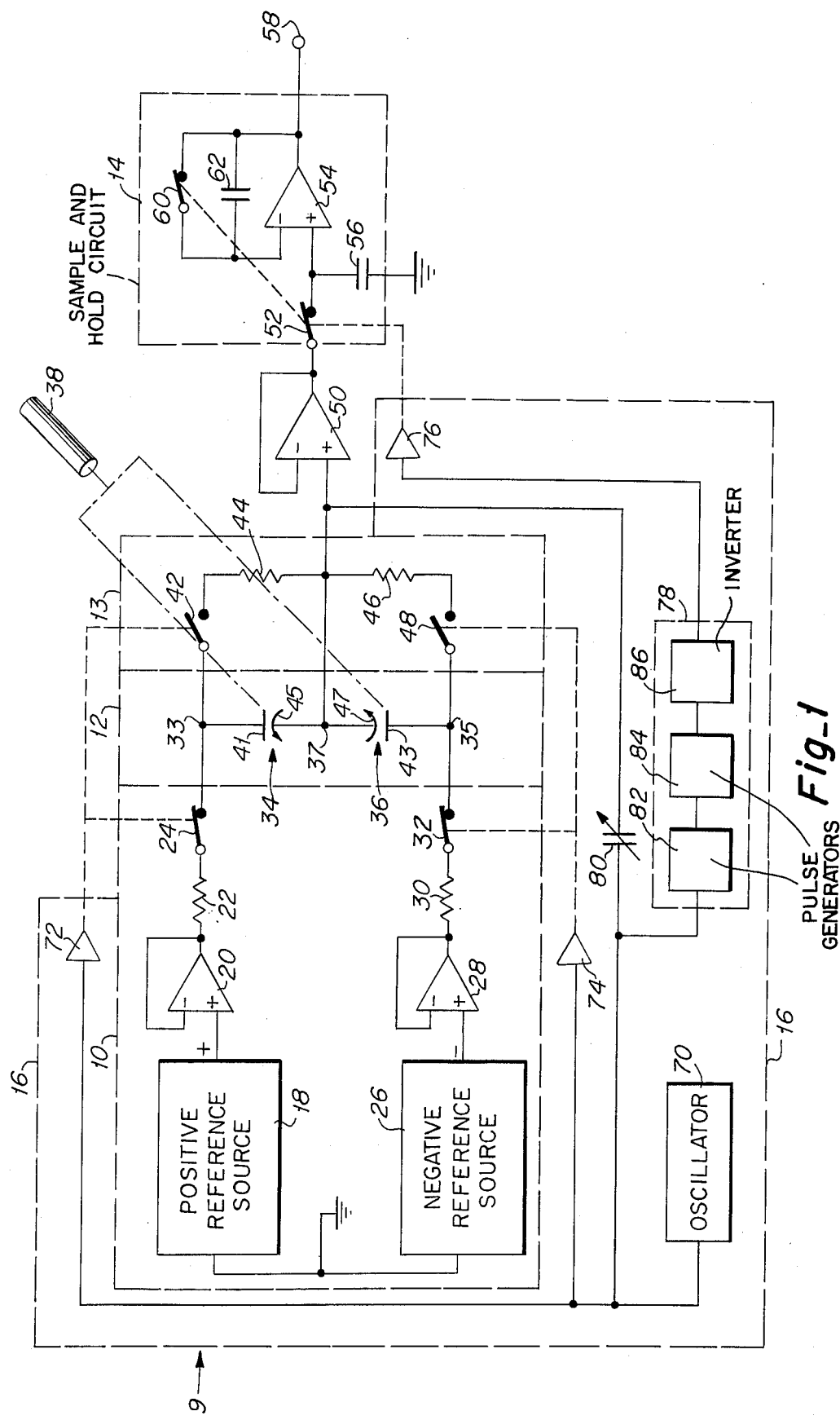
Fig_1

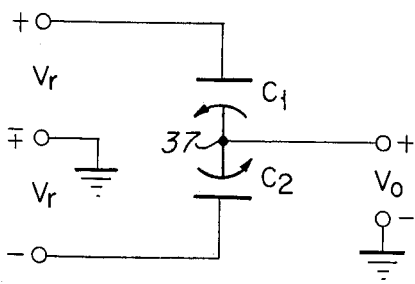
Fig_2
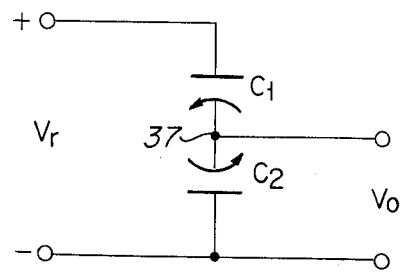
Fig_3
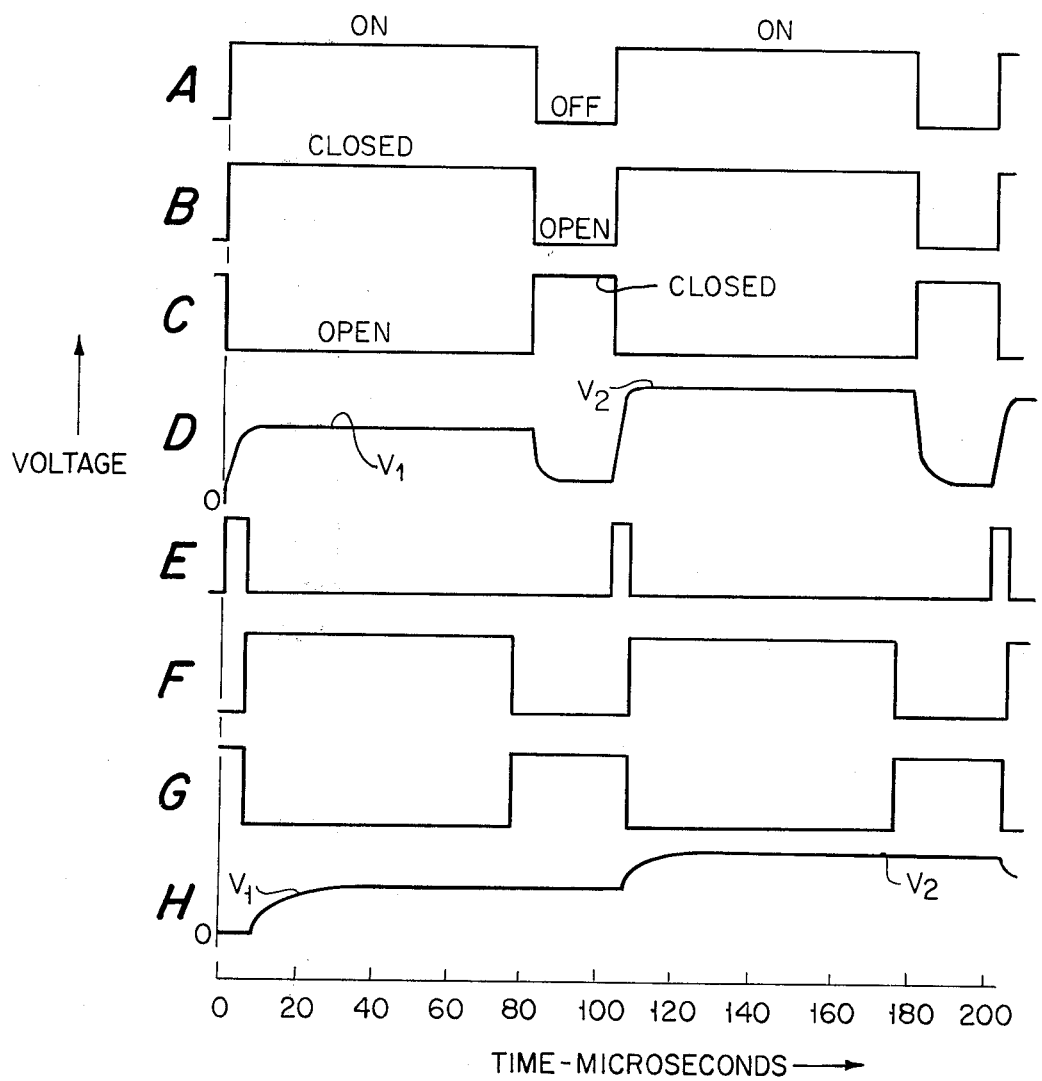
Fig_4

TWIN-CAPACITIVE SHAFT ANGLE ENCODER WITH ANALOG OUTPUT SIGNAL

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to angular position indicating devices, and more particularly, to a capacitive shaft encoder for providing an analog signal corresponding to the angular position of a shaft.

2. Description of the Prior Art

Heretofore, capacitive shaft encoders have employed an AC voltage source for excitation because of the availability of such excitation circuits. Although such voltage sources typically generate a signal having a precise frequency, it is difficult to accurately control the signal amplitude. This presents a problem when the source is applied to a capacitive divider network, since the output voltage of the network is proportional to the amplitude of the applied signal. Consequently, variations in the amplitude of the generated signal introduce errors into the output voltage of the encoder.

Examples of capacitive shaft encoders employing an alternating current voltage source are found in the U.S. Pat. Nos. to Higinbotham et al, 2,548,790; Wolfendale, 3,296,522; Eide et al, 3,783,374; and Melnyk, 3,702,467. Each of these devices has the disadvantage that the amplitude of the signal applied to a capacitor divider network may vary in amplitude, thus introducing errors into the output voltage.

In other related prior art, the Stick U.S. Pat. No. 3,760,392, teaches a capacitive shaft encoder which provides a digital output, and Bourgonnier et al, U.S. Pat. No. 2,659,039; Pihl, U.S. Pat. No. 2,847,640; and Lippel, U.S. Pat. No. 3,222,668, disclose various types of capacitive transducers suitable for use in shaft encoding devices.

SUMMARY OF THE PRESENT INVENTION

A primary object of the present invention is to provide a capacitive shaft encoder which employs a low cost, regulated direct current power supply and which serves to transform the precision of the power supply into an accurate analog signal indicative of the angular shaft position.

Briefly, the preferred embodiment comprises a source of direct current voltage, a rotatable shaft, a circuit including first and second identical variable capacitors connected in a series configuration, each capacitor including a fixed plate connected to an input terminal and a movable plate connected to a common terminal and movable relative to the fixed plate by the rotation of the shaft, each capacitor having a capacitance that varies linearly with a change in the angular position of the shaft, the sum of the two capacitances being constant for all angular positions of the shaft, a discharge circuit for discharging the voltage across the first and second capacitors, an oscillator for generating a control signal, switches responsive to the control signal and operative to alternately connect the source and the discharge circuit to the input terminals, the capacitors being charged by the source to voltages that are proportional to the angular position of the shaft, the capacitors being discharged when connected to the discharge circuit, a delay circuit for delaying the control signal, and a sample-and-hold circuit responsive to the delayed control signal and operative to sample and hold the voltage appearing at the common terminal after the capacitors are fully charged and to provide an output voltage which is proportional to the angular position of the shaft.

An advantage of the present invention is that the apparatus provides an accurate analog signal proportional to the angular position of a shaft and is not subject to errors introduced by the spurious charging of its capacitive components.

Another advantage is that the apparatus utilizes a direct current power supply which is low in relative cost and provides an extremely accurate and regulated output signal.

The foregoing and other objects, features and advantages of the invention will be apparent from the following detailed description of the preferred embodiment illustrated in the several figures of the drawing.

IN THE DRAWINGS

FIG. 1 is a schematic diagram generally illustrating a shaft encoder apparatus in accordance with the present invention;

FIGS. 2 and 3 are schematic illustrations conceptually showing two circuits for biasing the capacitive circuit of the present invention;

FIG. 4 is a timing diagram used to schematically illustrate operation of the apparatus shown in FIG. 1;

DESCRIPTION OF THE PREFERRED EMBODIMENT

Figure 5:
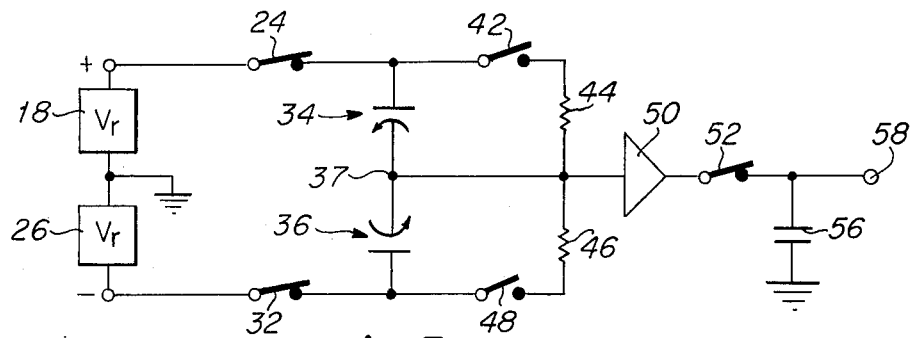
FIG. 5 is a simplified schematic illustration showing the principal components of the apparatus connected in the sample mode.

Referring now to FIG. 1 of the drawing, there is shown a schematic diagram of a capacitive shaft encoder 9 including a bias circuit referred to generally by the numeral 10, a capacitive potentiometer circuit referred to generally by the numeral 12, a discharge circuit 13, a sample-and-hold circuit referred to generally by the numeral 14, and a control circuit referred to generally by the numeral 16.

The bias circuit 10 includes a source 18 of positive direct current voltage connected to the noninverting input of an operational amplifier 20. The output of the amplifier 20 is connected to its inverting input and through output resistor 22 to a first terminal of a switch 24. Also, a source 26 of negative direct current voltage is connected to a noninverting input of an operational amplifier 28. The sources 18 and 26 are of the type which provide a regulated, stable direct current voltage having a precise preselected value. The output of the amplifier 28 is connected to its inverting input and through an output resistor 30 to a first terminal of a switch 32. The switches 24 and 32 are devices capable of responding to an electrical control signal and serve to selectively connect the sources 18 and 26 to the capacitive circuit 12.

The capacitive potentiometer circuit includes variable capacitors 34 and 36 which are electrically serially connected, having a common junction 37, or terminal, and having input terminals 33 and 35 that are connected to second terminals of the switches 24 and 32, respectively. The capacitors 34 and 36 each include a fixed plate 41 and 43, respectively, and a movable plate, 45 and 47, respectively, nd have identical characteristics. The movable plates 45 and 47 are mounted on a rotatable shaft 38 (shown schematically) and are movable relative to the fixed plates 41 and 43 in such a manner that the capacitance of each varies linearly with shaft angle and the sum of the two capacitances is constant over the entire range of shaft rotation. In particular, during a 180° rotation in a clockwise direction of the shaft 38, the capacitance of the capacitor 34 increases linearly from a minimum to a maximum while the capacitance of the capacitor 36 decreases linearly from a maximum, the sum of the two capacitances being constant over the entire 180° of shaft rotation. The circuit 12 serves as a voltage divider and provides a voltage at junction 37 that is proportional to the input voltage, the shaft angle, and the capacitance of the capacitors 34 and 36.

Referring also to FIG. 2, a simplified schematic diagram of the preferred embodiment of the biasing and the capacitive potentiometer circuits is illustrated. As shown, two voltage sources, each designated $V_r$, are connected in a series aiding configuration with the common terminals of the sources connected to ground and with the positive and negative terminals connected across the capacitors, C1 and C2, respectively. The output voltage $V_o$, is taken between the junction 37 and ground, and is given by the following equation:

$$V_o = V_r \left( 1 - \frac{2C2}{C1 + C2} \right)$$

It should be noted that the output voltage is proportional to the input voltage and to the capacitances C1 and C2. Since the values of the capacitances correspond to the angular position of the shaft 38, this embodiment provides an output voltage which varies continuously between $V_x$ and 0 volts for a shaft angle setting between $-90°$ and $0°$, and between 0 and $-V_x$ volts for a shaft angle setting between 0 and 90° where $V_x$ is less than $V_r$, depending upon the values of C1 and C2. It should be noted that C1 and C2 never attain a zero value of capacitance.

An alternative embodiment of the biasing and capacitive potentiometer circuits is illustrated in FIG. 3. In this embodiment, a voltage source $V_r$ is connected across the potentiometer circuit comprising the capacitors C1 and C2, and the output voltage, $V_o$, taken across the capacitor C2. For this embodiment the output voltage is given by the following equation:

$$V_o = V_r \frac{C1}{C1 + C2}$$

Again, the output voltage is proportional to the input voltage and the capacitances C1 and C2, which capacitances correspond to the angular position of the shaft 38.

The discharge circuit 13 is connected across the capacitors 34 and 36, and includes a switch 42, discharge resistors 44 and 46, and a switch 48 connected in a series configuration. The switches 42 and 48 are similar in construction and operation to the switches 24 and 32, and are devices capable of responding to an electrical control signal and serve to selectively connect the capacitors 34 and 36 to the discharge circuit 13. The terminal 37 is connected to the junction between the resistors 44 and 46. When the switches 42 and 48 are closed, the resistors 44 and 46 provide a discharge path and serve to dissipate the energy stored in the capacitor 34 and 36.

The center terminal 37 is also connected to the noninverting input of an operational amplifier 50. The output of the amplifier 50 is connected to its inverting input. The amplifier 50 has a high impedance and unity gain and serves as a buffer for voltages developed at the terminal 37.

The sample-and-hold circuit 14 includes a switch 52, an operational amplifier 54 and a storage capacitor 56. One terminal of the switch 54 is connected to the output of the amplifier 50 and another terminal is connected to a noninverting input of the amplifier 54 and to one terminal of the storage capacitor 56. The other terminal of the capacitor 56 is connected to ground. The switch 52 is operative to selectively pass voltages from the amplifier 50 to the amplifier 54. When the switch 52 is closed, the voltage is applied to the amplifier 54 and when open, the voltage is removed. During the time that the switch 52 is closed, the capacitor 56 charges to a voltage appearing at the junction 37 and holds the last voltage appearing there at the time that switch 52 is open.

The output 58 of the amplifier 54 is connected to its inverting input through a feedback network comprising a switch 60 in parallel with a capacitor 62. The switch 60 is characteristically matched to the switch 52. The switches 52 and 60 are similar in construction and operation to the switches 42 and 48. The capacitor 62 has an identical capacitance to that of the capacitor 56. Because of inherent capacitance, when the switch 52 opens it injects an error voltage, proportional to the capacitance of capacitor 56, into the amplifier 54. The matched switch 60, which opens simultaneously with the opening of switch 52, serves to inject an error-correcting voltage which is equal in magnitude to the error voltage into the amplifier 54 to cancel the effect of the opening of switch 52. It should be recognized that this technique of cancelling the error voltage due to voltage injection may be utilized only so long as the capacitance at the switches 52 and 60 is constant. The amplifier 54 serves to pass the voltage appearing across the capacitor 56 to its output 58.

The control circuit 16 includes an oscillator 70. analog switch drivers 72, 74 and 76, and a delay circuit 78.

The oscillator 70 is of the type which generates an alternating current signal having a rectangular waveform (see FIG. 4A), a frequency of 10kHz and a duty cycle of 0.8. Thus, the waveform has an "on" or charge time of approximately 80 microseconds and an "off" or discharge time of approximately 20 microseconds. The on and off times are chosen to be much greater than 5 times the time constant of the capacitors 34 and 36 and the resistors 44 and 46. The frequency of the oscillator need not be stabilized. Oscillator 70 may be, for example, a device manufactured by the Signetics Corporation and designated by them as the model NE555.

The output of the oscillator 70 is connected to the switch drivers 72 and 74 and the delay circuit 7. The driver 72 responds to the level of the signal produced by the oscillator 70 and serves to alternately open and close the switches 24 and 42 (see FIG. 4B) while the driver 74 also responds to the level of the signal produced by the oscillator 70 and serves to alternately open and close the switches 32 and 48 (see FIG. 4C). The drivers and the switches may be formed from a device manufactured by the Siliconix Corporation and designated by them as the FET Analog Switch Model DG191.

When the switches 24 and 32 are closed, the sources 18 and 26 are connected through unity gain amplifiers 20 and 28 to the capacitive circuit 12 and the switches 42 and 48 are open. During this time the capacitors 34 and 36 charge to a voltage proportional to the source voltages and to the capacitance of the capacitors. The switches 42 and 48 close when the switches 24 and 32 open and serve to connect the capacitors 34 and 36 to the discharge resistors 44 and 46.

Similar to the switches 52 and 60, the switches 42 and 48 have an inherent capacitance associated therewith which serves to inject a small charge into the capacitors 34 and 36, respectively, when the switches 42 and 48 are open (and switches 24 and 32 are closed). This charge is on the order of about 45 pico-coulomb per switch and produces an error voltage at the junction 37 which is inversely proportional to the capacitance of the capacitors 34 and 36. A trimming capacitor 80 having a variable capacitance is connected between the output of the oscillator 70 and the terminal 37 and serves to produce a voltage at the terminal 37 which cancels the error voltage generated when switches switches 42 and 48 are opened.

It should be recognized that this technique of cancelling the error voltage due to charge injection may be utilized only so long as the capacitance at the switches 24 and 42 is constant and the level of the voltage switched is constant. Since the total capacitance at the switches 24 and 42 is the sum of the capacitance of the parallel capacitors 34 and 36 which is designed to be a constant, the first condition is satisfied. Moreover, since the positive and negative reference sources 18 and 26 provide constant voltages, the second condition is satisfied. Consequently, the trimming capacitor 80 is effective to null out the error voltage introduced by the closing of the switches 24 and 32.

The delay circuit 78 comprises a pair of single shot generators 82 and 84, and an inverter 86 connected in a series configuration. The single shot generator 82 is triggered on the leading edge of the output signal of the oscillator 70 and produces a pulse having a width of about 5 microseconds (see FIG. 4E). The single shot generator 84 is triggered on the trailing edge of the output pulse of the generator 82 and produces a pulse which remains high for an interval of about 70 microseconds (see FIG. 4F) and falls to 0 volts about 5 microseconds before the output of the oscillator 70 turns off. The inverter 86 serves to invert the pulse appearing on the output of the generator 84 (see FIG. 4G) and to apply that pulse to the driver 76.

The driver 76 responds to the inverted pulse and serves to close the switches 52 and 60 about 5 microseconds after the switches 24 and 32 have closed, which is sufficient to allow the capacitors 34 and 36 to become fully charged, and to open the switches about 5 microseconds before the voltage across the capacitors 34 and 36 begins to discharge.

Figure 6:
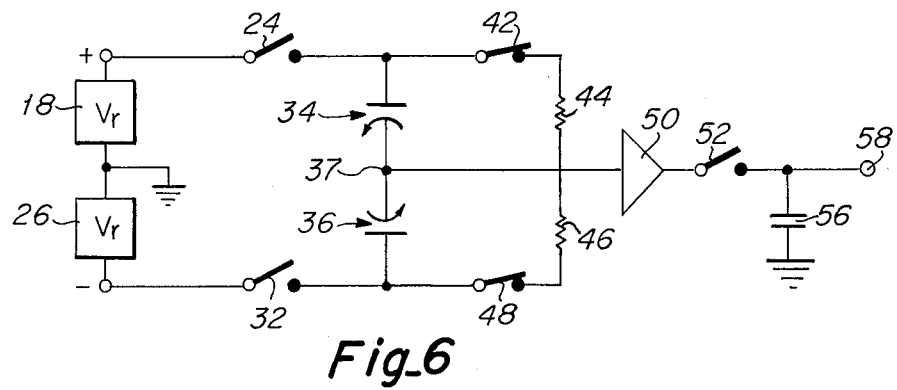
FIG. 6 is a simplified schematic illustration showing the principal components of the apparatus connected in the hold mode.

The operation of the present invention will now be described with reference also to FIGS. 4–6. FIG. 4 illustrates the waveforms of the signals encountered at various points in the capacitive shaft encoder 9. FIG. 4A represents the waveform of the signal generated by the oscillator 70. FIG. 4B represents the state of the switches 24 and 32. FIG. 4C represents the state of the switches 42 and 48. FIG. 4D represents the waveform of the voltage developed at the terminal 37. FIG. 4E represents the waveform at the output of the signal shot generator 82. FIG. 4F represents the waveform at the output of the signal shot generator 84. FIG. 4G represents the waveform at the output of the inverter 86. FIG. 4H represents the waveform at the output 58. FIGS. 5 and 6 schematically illustrate the condition of the principal components of the encoder in the sample mode and in the hold mode, respectively.

In operation, the shaft 38 is set to an initial angular position and the oscillator 70 is energized so as to provide the control signal shown in FIG. 4A to the drivers 72 and 74, and to the trimming capacitor 80. During the "on" time of the control signal, the drivers 72 and 74 cause the switches 24 and 32 to close (see FIG. 4B), thus connecting the sources 18 and 26 to the capacitors 34 and 36, and cause the switches 42 and 48 to open. Accordingly, the direct current reference voltages supplied by the sources 18 and 26 charge the capacitors 34 and 36, causing voltage $V_1$, which is proportional to the level of the source voltage and to angular position of the shaft 38 to be produced at the junction 37 (see FIG. 4D). A different angular position of the shaft 38 produces a voltage $V_2$ at a later time as shown in FIG. 4D. The error or offset voltages produced at the junction 37 by the opening of the switches 42 and 48 is effectively nulled out by an equal voltage developed across the capacitor 80.

The leading edge of the control signal also causes the single shot generator 82 to produce a pulse having a 5 microsecond duration (see FIG. 4E). In response to the trailing edge of this pulse, the single shot generator 84 produces a pulse having a 70 microsecond duration (see FIG. 4F), which is inverted by the inverter 86 (see FIG. 4G) and applied to the driver 76. The driver 76 responds to the negative-going edge of the inverted pulse, causing the switches 52 and 60 to close 5 microseconds after the closing of the switches 24 and 32. When the switches 24, 32, 52 and 60 are closed, the encoder 9 is referred to as being in the sample mode (see FIG. 5).

In the sample mode, the voltage at the terminal 37 is conducted through the amplifier 50 and the switch 52, causing the storage capacitor 56 to charge to the same level, which level is applied to the output 58 through the amplifier 54 as illustrated in FIG. 4H.

After remaining on for 70 microseconds the output of the single shot generator 84 turns off, causing the inverted pulse supplied to the driver 76 to go positive. In response to this positive-going pulse, the driver 76 deactivates the switches 52 and 60, causing them to open, and holding the last appearing voltage on capacitor 56 until the trailing edge of the next 5-microsecond pulse from one-shot pulse generator 82. This condition is referred to as the hold mode and is generally illustrated in FIG. 6. In FIG. 4G, the positive pulses represent the "hold" periods whereas the periods between the positive pulses are the "sample" periods.

In the hold mode, the last appearing voltage on capacitor 56 is held while the voltages on the capacitors 34 and 36 are discharged through the respective resistors 44 and 46 to about zero volts (see FIG. 4D). When the oscillator 70 turns on again, the switches 42 and 48 open, the switches 24 and 32 close, and the capacitors 34 and 36 once again charge to a voltage corresponding to the angular position of the shaft 38.

Figure 7:
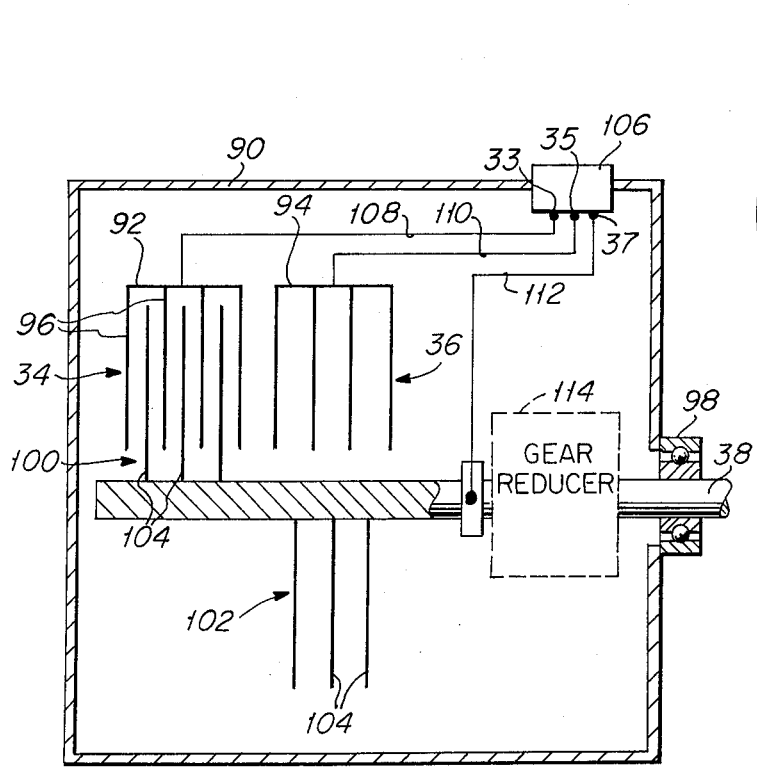
FIG. 7 is an axial cross section of a capacitive circuit.
Figure 8:
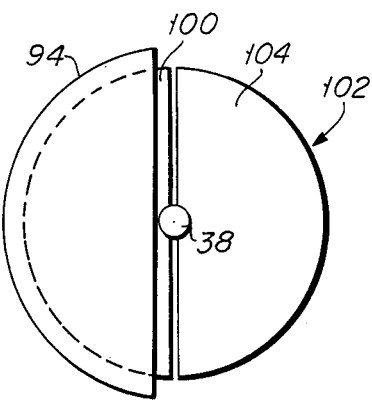
FIG. 8 is a front view of the plates of the capacitive circuit of FIG. 7.

FIGS. 7 and 8 illustrate a preferred embodiment of the capacitive potentiometric circuit 12. As illustrated, the circuit 12 includes a cylindrical housing 90 having a pair of stationary sections 92 and 94 mounted to its inner surface. The sections 92 and 94 are comprised of a plurality of parallel semicircularly-shaped metal plates 96. The axially extending shaft 38 is rotatably mounted to the housing 90 by a bearing assembly 98. A pair of sections 100 and 102 are secured to opposite surfaces of the shaft 38. Each section 100 and 102 comprises a plurality of parallel semicircularly-shaped metal plates 104 which cooperate with the plates 96 to form the variable capacitors 34 and 36. An electrical connector 106 is mounted on the housing 90 and includes the terminals 33, 35 and 37. A conductor 108 connects the terminal 33 to the section 92, a conductor 110 connects the terminal 35 to the section 94 and a conductor 112 connects the terminal 37 to the shaft 38.

As the shaft 38 is rotated through an angle of 180°, the movable plates 104 move relative to the fixed plates 96 causing the capacitance of the capacitor 34 to decrease linearly with the variation in shaft angle and the capacitance of the capacitor 36 to increase linearly with the variation in sahft angle, the total capacitance of the capacitors 34 and 36 appearing at the terminals 33 and 35 remaining constant.

As an additional feature, a gear reducer, shown in dashed lines and illustrated by the numeral 114, having a 1:2N ratio may be utilized to provide a continuous change in the capacitance over an N × 360° shaft rotation. Also, the movable plates may be driven by a cam to provide the desired capacitance relationship.

Although the present invention has been described above in terms of a preferred embodiment, it will be appreciated that various alterations and modifications thereof will become apparent to those skilled in the art after having read the preceding disclosure. Accordingly, it is intended that the following claims be interpreted as including all such alterations and modifications as fall within the true spirit and scope of the invention.

What is claimed is:

1. Shaft encoder apparatus comprising:
   first and second variable capacitors connected in tandem with a rotatable shaft, each of said capacitors having a capacitance that varies linearly with a change in the angular position of said shaft, the sum of the capacitance of said capacitors being constant for the entire range of rotation of said shaft;
   means for electrically joining said capacitors in series;
   means for supplying first and second reference d-c voltages;
   means for periodically applying said first and second reference d-c voltages to said first and second capacitors, respectively;
   means for periodically discharging said first and second capacitors; and
   means for periodically sampling the voltage at the junction between said capacitors when said capacitors are fully charged, said voltage being a function of the angular position of said shaft.

2. Shaft encoder apparatus comprising:
   first and second variable capacitors connected in tandem with a rotatable shaft, each of said capacitors having a capacitance that varies linearly with a change in the angular position of said shaft, the sum of the capacitances of said capacitors being constant over the entire range of rotation of said shaft;
   means for electrically joining said variable capacitors in series;
   first and second regulated d-c voltage sources;
   means for enabling the charging of said first and second variable capacitors and the alternate discharging of said first and second variable capacitors, sad first variable capacitor being charged by said first regulated d-c voltage source and said second variable capacitor being charged by said second regulated d-c voltage source, the voltage at the junction between said variable capacitors when said capacitors are charged being a function of the angular position of said shaft; and
   means connected to said junction for periodically sampling and holding the voltage appearing at said junction.

3. Apparatus as set forth in claim 2 wherein said means for sampling and holding comprises an operational amplifier with an inverting input, a noninverting input and an output, first and second capacitors having the same capacitance, said first capacitor being coupled between said noninverting input and ground, said second capacitor being coupled between said inverting input and said output, and means for periodically shorting said inverting input to said output and periodically opening the signal path to said noninverting input at a point preceding said first capacitor.

4. Shaft encoder apparatus comprising:
   first and second variable capacitors connected in tandem with a rotatable shaft, each of said capacitors having a capacitance that varies linearly with a change in the angular position of said shaft, the sum of the two capacitances being constant for the entire range of rotation of said rotatable shaft;
   first and second d-c voltage sources connected in series with a first node therebetween, said sources generating constant voltages;
   means for connecting said first and second capacitors in series with a second node therebetween;
   first switch means for periodically coupling said first d-c voltage source across said second capacitor at a frequency A;
   second switch means for periodically coupling said second d-c voltage source across second capacitor at a frequency B;
   means coupled to said first and second capacitors for periodically discharging said capacitors at a frequency C; and
   means for periodically sampling the voltage between said first and second nodes when said capacitors are fully charged, said voltage being a function of the angular orientation of said rotatable shaft, said frequencies A and B being in phase with each other and 180° out of phase with frequency C.

5. Apparatus as claimed in claim 4 wherein said discharging means comprises first and second switches, means for opening and closing said switches, and first and second resistors, said first switch and said first resistor coupled in series across said first capacitor, said second switch and said second resistor coupled in series across said second capacitor.

6. Apparatus as claimed in claim 4 further including means for imposing an error-correcting voltage on said second node when said first and second switches are open.

7. Shaft encoder apparatus comprising:

first and second varible capacitors connected in tandem with a rotatable shaft, each of said variable capacitors having a capacitance that varies linearly with a change in the angular position of said shaft, the sum of the capacitances of said variable capacitors being constant over the complete range of rotation of said shaft;

first and second regulated d-c voltage supplies each having a positive and a negative output, said negative output of said first supply and said positive output of said second supply being grounded;

a terminal, each variable capacitor including a fixed plate and a movable plate, said movable plates being connected to said terminal;

a first switch connected between said first supply positive output and said fixed plate of said first variable capacitor;

a second switch connected between said second supply negative output and said fixed plate of said second variable capacitor;

first and second resistors;

a third switch connected in series with said first resistor between said fixed plate of said first variable capacitor and said terminal;

a fourth switch connected in series with said second resistor between said fixed plate of said second variable capacitor and said terminal;

means for periodically opening and closing said first and second switches in synchronism;

means for periodically opening and closing said third and fourth switches in synchronism, said first and second switches being closed when said third and fourth switches are open, said first and second switches being closed long enough for each of said capacitors to fully charge to the level of its respective d-c voltage supply, said third and fourth switches being closed long enough for each of said capacitors to be fully discharged; and means coupled to said terminal for periodically sampling and holding the voltage appearing at said terminal, said voltage being a function of the angular orientation of said rotatable shaft.

8. Shaft encoder apparatus as set forth in claim 7 wherein means are provided for adding an error-compensating voltage to said terminal whenever said third and fourth switches are open.

9. Shaft encoder apparatus as set forth in claim 7 wherein said means for sampling and holding comprises an operational amplifier with an inverting input, a noninverting input, and an output, first and second capacitors having the same capacitance, said first capacitor being coupled between said noninverting input and ground, said second capacitor being coupled between said inverting input and said output, and means for periodically shorting said inverting input to said output and periodically opening the signal path to said noninverting input at a point preceding said first capacitor.

* * * * *